United States Patent
Coetzee et al.

(10) Patent No.: US 10,065,454 B2
(45) Date of Patent: Sep. 4, 2018

(54) ASSEMBLY FOR LOOSENING OR TIGHTENING MECHANICAL NUTS (ESP. WHEEL NUTS)

(71) Applicant: The Trustees for the Time-Being of Le Moulin Trust, Benoni (ZA)

(72) Inventors: Hendrik Bernardus Coetzee, Benoni (ZA); Renier Coetzee, Benoni (ZA)

(73) Assignee: The Trustees for the Time-Being of Le Moulin Trust, Benoni (ZA)

( * ) Notice: Subject to any disclaimer, the term of this patent is extended or adjusted under 35 U.S.C. 154(b) by 430 days.

(21) Appl. No.: 14/436,707

(22) PCT Filed: Oct. 16, 2013

(86) PCT No.: PCT/IB2013/059399
§ 371 (c)(1),
(2) Date: Apr. 17, 2015

(87) PCT Pub. No.: WO2014/087267
PCT Pub. Date: Jun. 12, 2014

(65) Prior Publication Data
US 2016/0046147 A1 Feb. 18, 2016

(30) Foreign Application Priority Data

Oct. 19, 2012 (ZA) .................................. 2012/07897

(51) Int. Cl.
| | | |
|---|---|---|
| *B60B 29/00* | (2006.01) | |
| *B25B 19/00* | (2006.01) | |
| *B25D 1/16* | (2006.01) | |

(52) U.S. Cl.
CPC ............ *B60B 29/005* (2013.01); *B25B 19/00* (2013.01); *B25D 1/16* (2013.01); *B60B 29/007* (2013.01)

(58) Field of Classification Search
CPC ... B25B 23/00; B25B 23/142; B25B 23/1427; B25B 23/16; B60B 29/00; B60B 29/005; B60B 29/007; B25D 1/16
See application file for complete search history.

(56) References Cited

U.S. PATENT DOCUMENTS 2,267,012 A 12/1941 Bowne
3,097,550 A * 7/1963 Johnston ............... B60B 29/007
248/55

(Continued)

FOREIGN PATENT DOCUMENTS

CN 2320377 Y 5/1999
EP 0694369 1/1996
(Continued)

OTHER PUBLICATIONS

International Preliminary Report on Patentability and Written Opinion in PCT/IB2013/059399 dated Apr. 21, 2015 (6 pages).

(Continued)

*Primary Examiner* — Christopher M Koehler
(74) *Attorney, Agent, or Firm* — Ladas & Parry LLP

(57) ABSTRACT

An assembly (200) for loosening or tightening mechanical nuts includes a socket arm (40) defining a socket (42) at its distal end for engaging a mechanical nut (102); a crank (30) connected or connectable at its first end transversely to a proximate end of the socket arm (40); a sliding hammer (20) connected or connectable to a second end of the crank (30), thereby being operable to impart a rotational impact on the socket arm (40) via the crank (30); and a support structure (250) connected or connectable at its proximate end to one of the socket arm (40), crank (30), or sliding hammer (20) and defining at its remote end a support surface (260) operable to bear against an external structure (100) thereby to support the assembly (200) in use.

15 Claims, 10 Drawing Sheets

(56) References Cited

U.S. PATENT DOCUMENTS

| | | | | |
|---|---|---|---|---|
| 3,158,050 A * | 11/1964 | Shandel | B25B 19/00 | |
| | | | 173/93 | |
| 3,691,826 A * | 9/1972 | Grabovac | G01L 25/003 | |
| | | | 73/862.21 | |
| 3,730,027 A * | 5/1973 | Rohn | B60B 29/007 | |
| | | | 81/462 | |
| 3,783,682 A * | 1/1974 | Lipari | B25B 23/142 | |
| | | | 73/862.23 | |
| 4,091,664 A * | 5/1978 | Zerver | B25B 23/1427 | |
| | | | 116/DIG. 1 | |
| 4,620,462 A * | 11/1986 | Parker | B60B 29/007 | |
| | | | 81/177.5 | |
| 4,675,968 A | 6/1987 | Bartlett | | |
| 4,748,878 A * | 6/1988 | Chen | B25B 13/06 | |
| | | | 29/275 | |
| 4,829,856 A * | 5/1989 | Reynolds | B25B 23/00 | |
| | | | 254/133 R | |
| 4,838,134 A * | 6/1989 | Ruland | B25B 23/1427 | |
| | | | 81/467 | |
| 4,972,742 A * | 11/1990 | Brown | B60B 29/007 | |
| | | | 81/180.1 | |
| 5,018,413 A * | 5/1991 | Vazquez | B60B 29/007 | |
| | | | 81/180.1 | |
| 5,109,739 A | 5/1992 | Hull et al. | | |
| 5,199,505 A * | 4/1993 | Izumisawa | B25B 21/026 | |
| | | | 173/93.6 | |
| 5,263,392 A * | 11/1993 | Schoen | B60B 29/007 | |
| | | | 81/180.1 | |
| 5,431,074 A * | 7/1995 | Durante | B60B 29/007 | |
| | | | 81/124.4 | |
| 5,613,411 A * | 3/1997 | Rines | B60B 29/007 | |
| | | | 81/177.2 | |
| 5,967,005 A * | 10/1999 | DeVore | B60B 29/007 | |
| | | | 81/180.1 | |
| 6,041,681 A * | 3/2000 | Griffin, Sr. | B60B 29/007 | |
| | | | 248/407 | |
| 6,125,719 A | 10/2000 | Lowther et al. | | |
| 6,155,147 A * | 12/2000 | Dzieman | B25B 15/02 | |
| | | | 81/467 | |
| 6,349,618 B1 | 2/2002 | Lowther | | |
| 6,474,198 B2 | 11/2002 | Lowther | | |
| 6,748,832 B1 * | 6/2004 | Maxwell | B60B 29/003 | |
| | | | 81/121.1 | |
| 6,769,333 B2 * | 8/2004 | Keady | B60B 29/007 | |
| | | | 81/180.1 | |
| 2008/0136168 A1 * | 6/2008 | Ungchusri | F16B 23/0069 | |
| | | | 285/39 | |
| 2013/0291690 A1 * | 11/2013 | Wang | B25B 13/48 | |
| | | | 81/124.6 | |
| 2015/0183104 A1 * | 7/2015 | Patterson | B25D 1/16 | |
| | | | 81/25 | |

FOREIGN PATENT DOCUMENTS

| | | |
|---|---|---|
| EP | 0694369 A1 | 1/1996 |
| EP | 2353787 | 8/2011 |

OTHER PUBLICATIONS

International Search Report dated Jan. 4, 2014 for PCT Application No. PCT/IB2013/059399, 5 pages.
Second Office Action and Translation in Chinese Patent Application No. 201380065825.5 dated Jan. 16, 2017, 15 pages.

* cited by examiner

ASSEMBLY FOR LOOSENING OR TIGHTENING MECHANICAL NUTS (ESP. WHEEL NUTS)

CROSS REFERENCE TO RELATED APPLICATIONS

This application is a U.S. national stage application of International Patent Application Ser. No. PCT/IB2013/059399, filed Oct. 16, 2013, which claims the benefit of and priority to ZA Application No. 2012/07897, filed Oct. 19, 2012. The entire disclosures of these two applications are hereby incorporated by reference in their entireties.

FIELD OF INVENTION

This invention relates to an assembly for loosening or tightening (and optionally torqueing of) mechanical nuts (esp. wheel nuts) and to a method of loosening mechanical nuts using such an assembly.

BACKGROUND OF INVENTION

The Inventors are well aware of how difficult it can be to loosen stubborn or seized mechanical nuts from a corresponding bolt shank. This is especially true for wheel nuts. Conventional wheel spanners or tyre irons can be inadequate for providing the initial force required to loosen a stubborn nut.

The inventors are aware of slogging spanners which comprise, at one end, a spanner head to engage with a nut and, at the other end, a striking surface or anvil to receive blows from a hammer. A difficulty with use of a slogging spanner is that it sometimes cannot fit onto a nut especially if the nut is recessed in a wheel rim and, upon being struck, it can be flung rapidly from the nut, possibly causing damage or injury.

Sliding hammers are also known in the art for providing a guided and controlled striking action. In fact, U.S. Pat. No. 5,109,739 in an embodiment discloses an assembly comprising the combination of a sliding hammer connected via a crank to a socket spanner which is connectable to a wheel. The crank, in this configuration, functions similarly to a slogging spanner. A drawback of U.S. Pat. No. 5,109,739, in the opinion of the Inventors, is that operating the assembly can be difficult, requiring one hand to actuate the sliding hammer and the other hand both to support the assembly and to urge it against the wheel nut.

The Inventors thus desire an improved assembly for loosening or tightening and optionally torqueing of mechanical nuts (esp. wheel nuts) which overcomes or at least alleviates the above-mentioned drawbacks.

SUMMARY OF INVENTION

Accordingly, the invention provides an assembly for loosening or tightening mechanical nuts, the assembly including:
  a socket arm defining a cavity at its distal end for engaging a mechanical nut;
  a crank connected or connectable at its first end transversely to a proximate end of the socket arm;
  a sliding hammer connected or connectable to a second end of the crank, thereby being operable to impart a rotational impact on the socket arm via the crank; and
  a support structure connected or connectable at its proximate end to one of the socket arm, crank, or sliding hammer and defining at its remote end a support surface operable to bear against an external structure thereby to support the assembly in use.

The socket arm may define splines at its proximate end and the crank may define mating splines at its first end to mate therewith and maintain the angular correspondence therebetween.

The crank may be pivotally connected at its second end to a proximate end of the sliding hammer. The crank and sliding hammer may be interconnected by means of an axle or locking pin.

The support structure may be connected or connectable to the socket arm. The support structure may define a channel to accommodate a portion of the socket arm.

The support structure may include a carrier member which defines the channel. The channel may be operable to permit rotation of the socket arm (e.g. as transmitted from the crank) but to prevent radial displacement of the socket arm.

In one embodiment, the support surface of the support structure may be configured to bear against a component (e.g. wheel hub) of a machine (e.g. vehicle) to which the nut is fastened. In such case, the support surface may be annular, resembling a collar clamp.

In another embodiment, the support surface may be configured to bear against the ground. In such case, the support surface may be in the form of a foot and the support structure may include a support leg extending upwardly from the foot. The foot may be pivotable relative to the support leg. The support leg may be height adjustable. In one embodiment, the support leg may be telescopic. In another embodiment, the carrier member may be slidable along the support leg. The support structure may include a locking mechanism to lock the carrier member to the support leg at a desired height, thereby to align the socket arm with the nut.

Naturally, the assembly may also be used for tightening a nut (esp. a wheel nut).

The assembly may include a torque indicator. The torque indicator may be in the form of an indicator ring assembly arranged between two moving parts. The indicator ring assembly may be operable to indicate visually the relative displacement between the two parts. The indicator ring assembly may be arranged between the support structure (on the one hand) and the socket arm (on the other hand) thereby to indicate the relative rotational displacement of the socket arm relative to the support structure. The rotational displacement may be indicative of torque.

The invention extends to a method of loosening a mechanical nut using an assembly as defined above, the method including:
  adjusting the support structure so that the socket arm is aligned with the nut;
  engaging the distal end of the socket arm with the nut; and
  actuating the sliding hammer to impart an impact via the crank and socket arm to the nut.

If the sliding hammer and crank are relatively pivotable, the method may include orientating the sliding hammer and crank transversely to each other before actuating the sliding hammer, thereby to transmit maximum impact to the nut.

The method may include torqueing the nut using a torque indicator. The method may thus include:
  tightening the nut to a definable reference point using the slogging hammer; and
  further tightening the nut by a pre-defined angular distance as indicated by the torque indicator.

BRIEF DESCRIPTION OF DRAWINGS

The invention will now be further described, by way of example, with reference to the accompanying diagrammatic drawings.

In the drawings.

DETAILED DESCRIPTION OF PREFERRED EMBODIMENT

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

Figure 1:
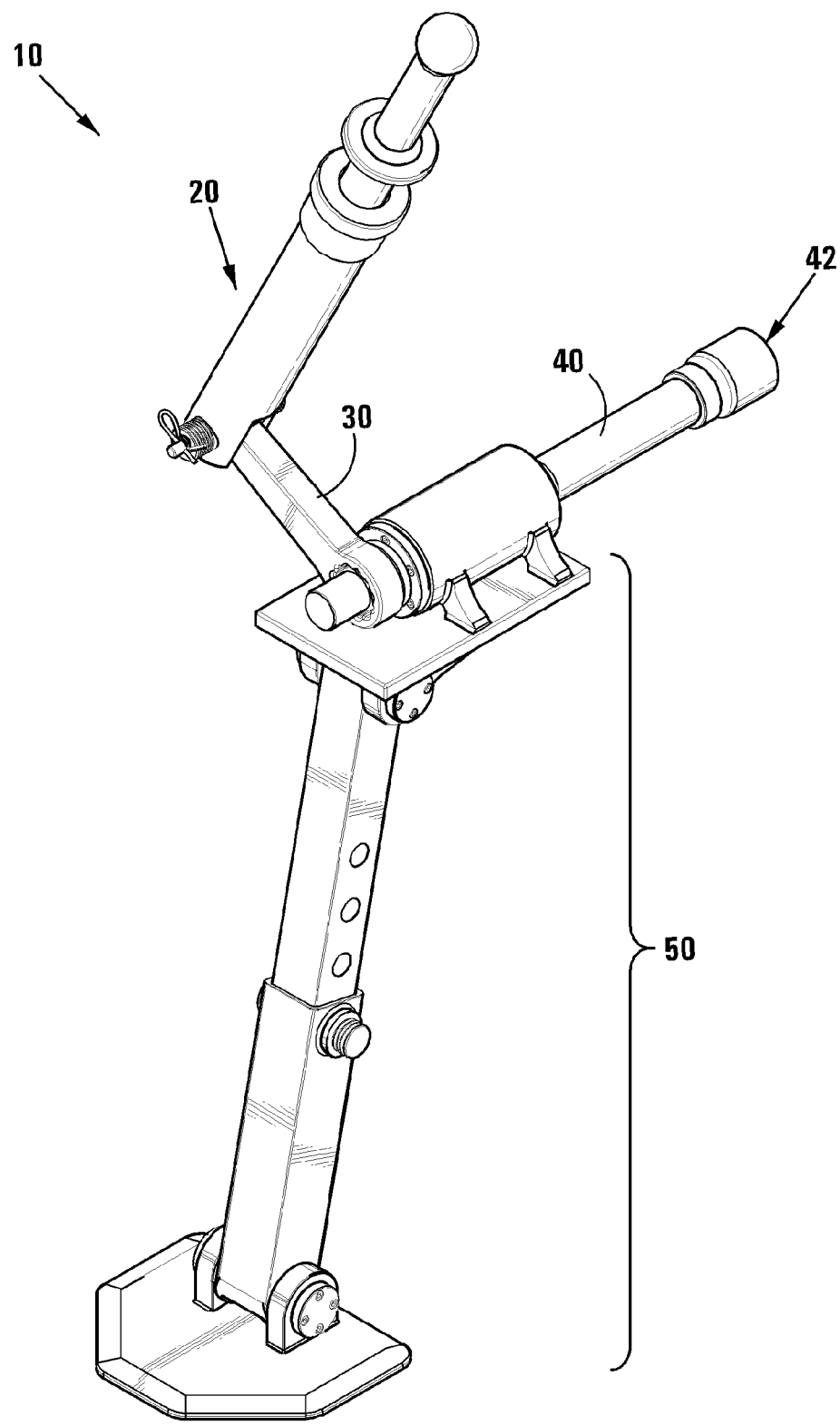
FIG. 1 shows a three-dimensional view of one embodiment of an assembly, in accordance with the invention, for loosening or tightening mechanical nuts.
Figure 2:
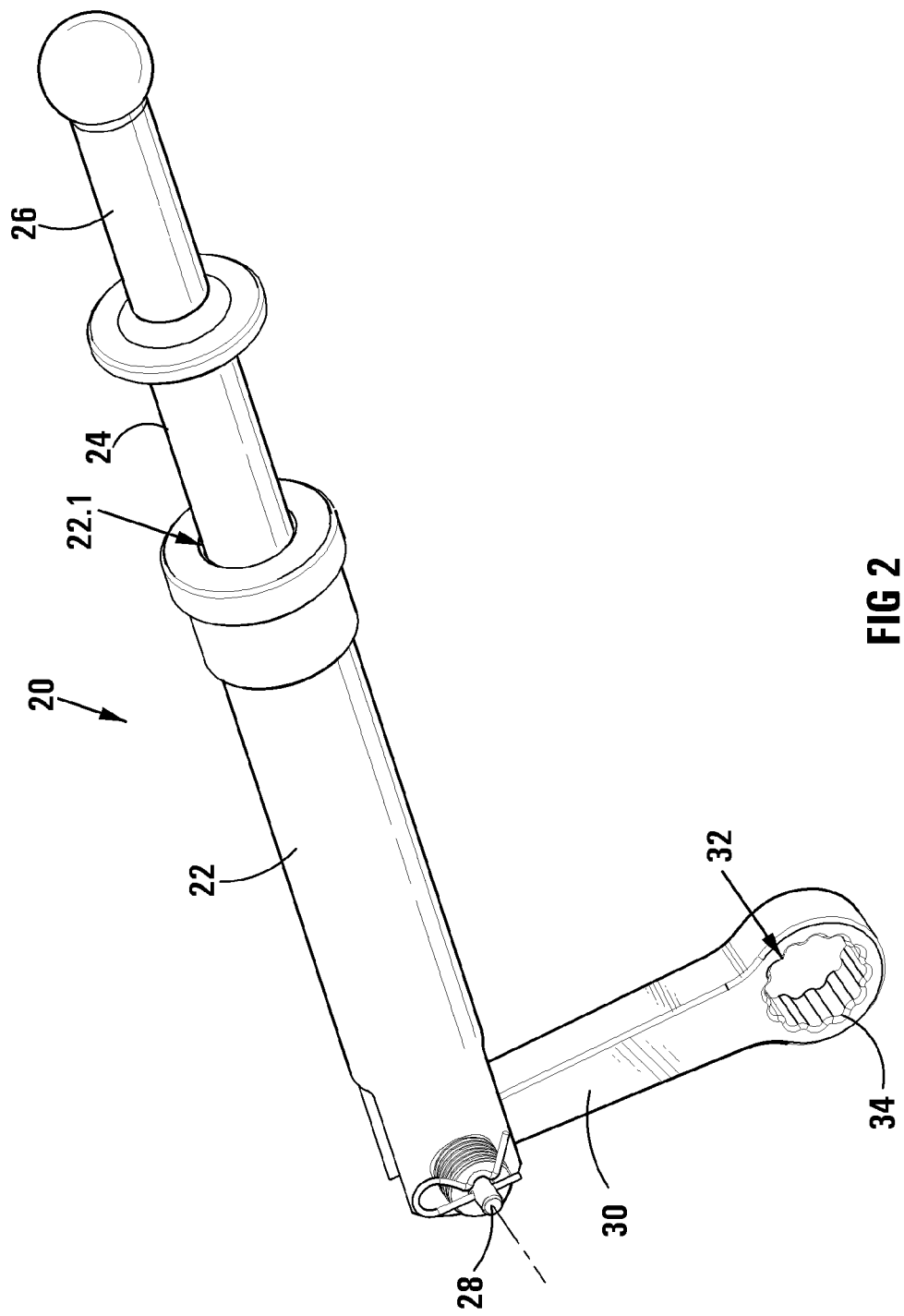
FIG. 2 shows a three-dimensional view of a sliding hammer and crank of the assembly of FIG. 1.
Figure 3:
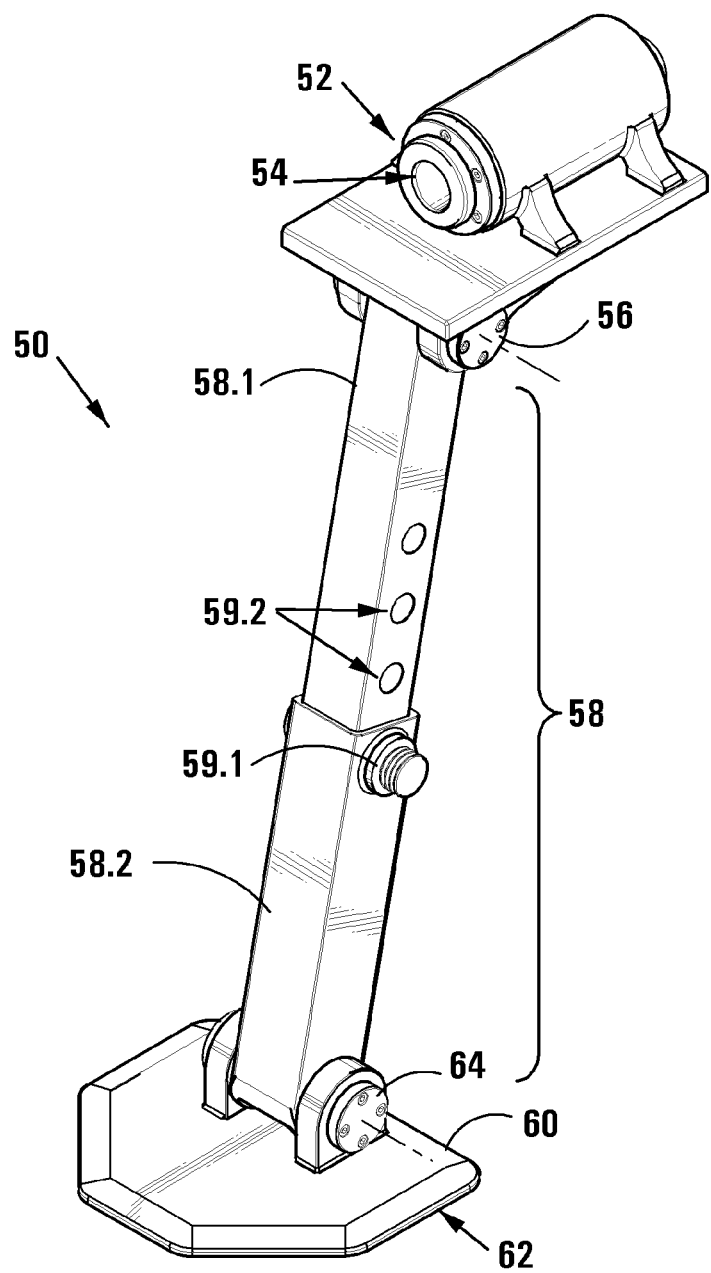
FIG. 3 shows a three-dimensional view of a support structure of the assembly of FIG. 1.

Referring to FIGS. 1-3, reference numeral 10 generally indicates an assembly, in accordance with the invention, for loosening mechanical nuts. The example is further described with reference to wheel nuts because the assembly 10 finds particular application here, although its application is not limited thereto.

The assembly 10 includes a sliding hammer 20, a crank 30, a socket arm 40, and a support structure 50. In this example, each of these components is modular and interchangeable, but in other examples some of the components could be integrated.

The sliding hammer 20 (shown in more detail in FIG. 2) includes a cylinder 22 defining therein a guide path 22.1 to accommodate a piston 24. A free end of the piston 24 has a handle 26 connected thereto for gripping and hand-actuation of the sliding hammer 20. Preferably, the piston 24 and handle 26 are weighty, thus being able to strike the crank 30 with useful force. Further, the hammer 20 may include an impact head (not illustrated) on an inner end of the piston 24.

The crank 30 (also shown in FIG. 2) is elongate and interconnects the sliding hammer 20 and the socket arm 40. A second end of the crank 30 is pivotably connected to the sliding hammer 22 by means of a locking pin 28 which also serves as an axle about which the sliding hammer 20 can pivot. The other end (i.e. the first end) of the crank 30 defines an aperture 32 with splines 34 on an inner wall thereof to mesh with corresponding splines (not illustrated) or hexagonal periphery of the socket arm 40. The socket arm 40 defines at its distal end a conventional hexagonal socket 42 for engaging with a nut to be loosened (or fastened, as the case may be). The crank 30 and the socket 42 are interchangeable depending on the size of the nut and wheel assembly 100 requiring attention.

The support structure 50 (shown separately in FIG. 3) is important because it enhances the effectiveness of the remainder of the assembly 10. The support structure 50 in this example is used to support the remainder of the assembly 10 on the ground 106 (refer to FIG. 4). Thus, the support structure 50 includes a carrier member 52, a height-adjustable support leg 58 and a foot 60. The carrier member 52 defines a channel 54 to accommodate the socket arm 40 while permitting rotation thereof. The carrier member 52 is pivotably connected to the support leg 58 by means of a pivot joint 56.

The support leg 58 is telescopic and comprises an upper portion 58.1 which is slidably receivable within a lower portion 58.2. The upper portion 58.1 defines an axially-extending series of sockets 59.2 for receiving a locking bolt 59.1 thereby to lock the leg 58 at a desired length. The locking bolt 59.1 may be spring-biased.

The foot 60 defines on a lower surface thereof a support surface 62 for bearing against the ground 106. The support surface 62 may have a non-slip material, e.g. rubber. Like the carrier member 52, the foot 60 is pivotably connected to the support leg 58 by means of a pivot joint 64. The support leg 58 can therefore be inclined by pivoting of the pivot joints 56, 64, while maintaining a level orientation of the carrier member 52 and the foot 60. This permits further adjustment and placement of the support structure 50.

Figure 4:
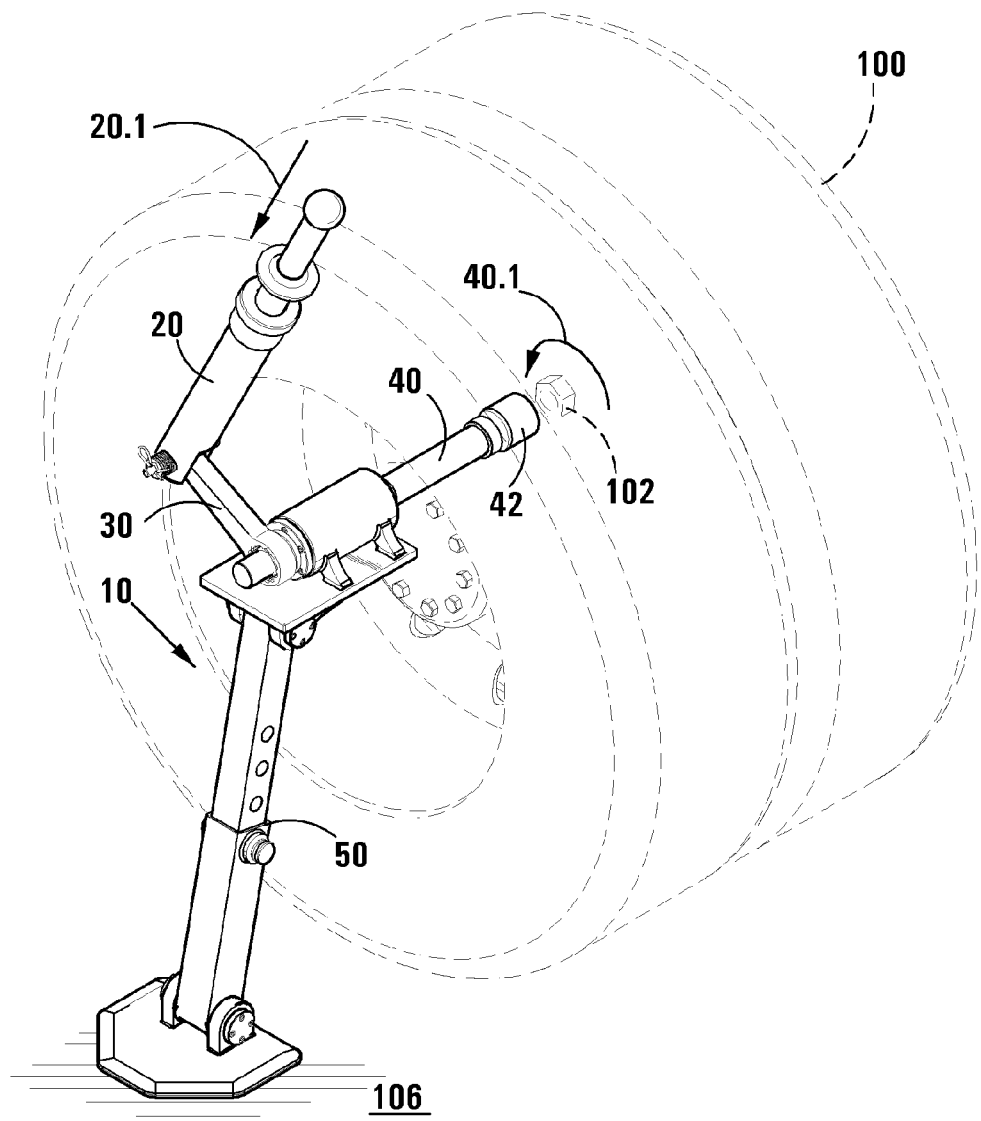
FIG. 4 shows a three-dimensional view of the assembly of FIG. 1 in use.

In use, and referring now to FIG. 4, the assembly 10 is employed to loosen a stubborn wheel nut 102 of a wheel assembly 100. First, the support leg 58 is adjusted to a suitable height using the bolt 59.1 and sockets 59.2 for course height adjustment. If necessary, the angle of the leg 58 can be varied for fine height adjustment. The socket 42 of the socket arm 40 is urged around and over the nut 102 to be loosened.

The aperture 32 of the crank 30 is guided over the proximate end of the socket arm 40 so that the respective splines 34 mate. The sliding hammer 20 is then angled to be perpendicular to the crank 30 and also transverse to the socket arm 40. The handle 26 of the sliding hammer 20 is extended by pulling it outwardly, and then displaced rapidly inwardly in a hammer-like action by forcefully urging the handle 26 towards the proximate end of the sliding hammer 20 (as indicated by arrow 20.1). This hammer blow imparts a force via the crank 30 to the socket arm 40 and ultimately to the nut 102 in a direction indicated by arrow 40.1. The crank 30 provides mechanical advantage.

In use, the hammer action may be repeated a few times to dislodge the stubborn nut 102. Once dislodged, it can be removed by connecting a conventional socket spanner (not illustrated) to the socket arm 40 or by removing the supporting structure and continuing with the sliding hammer 20, in a more relaxed fashion, or simply by using fingers. To tighten a nut 102, the procedure may simply be applied in reverse.

FIGS. 5-12 shows another embodiment 200 of an assembly, in accordance with the invention, for loosening mechanical nuts. The assembly 200 embodies the same inventive concept as that of assembly 10 but with some mechanical variations, most notably in the support structure and indicator ring assembly. Thus, the same numerals in the FIGURES refer to the same or similar components.

Figure 5:
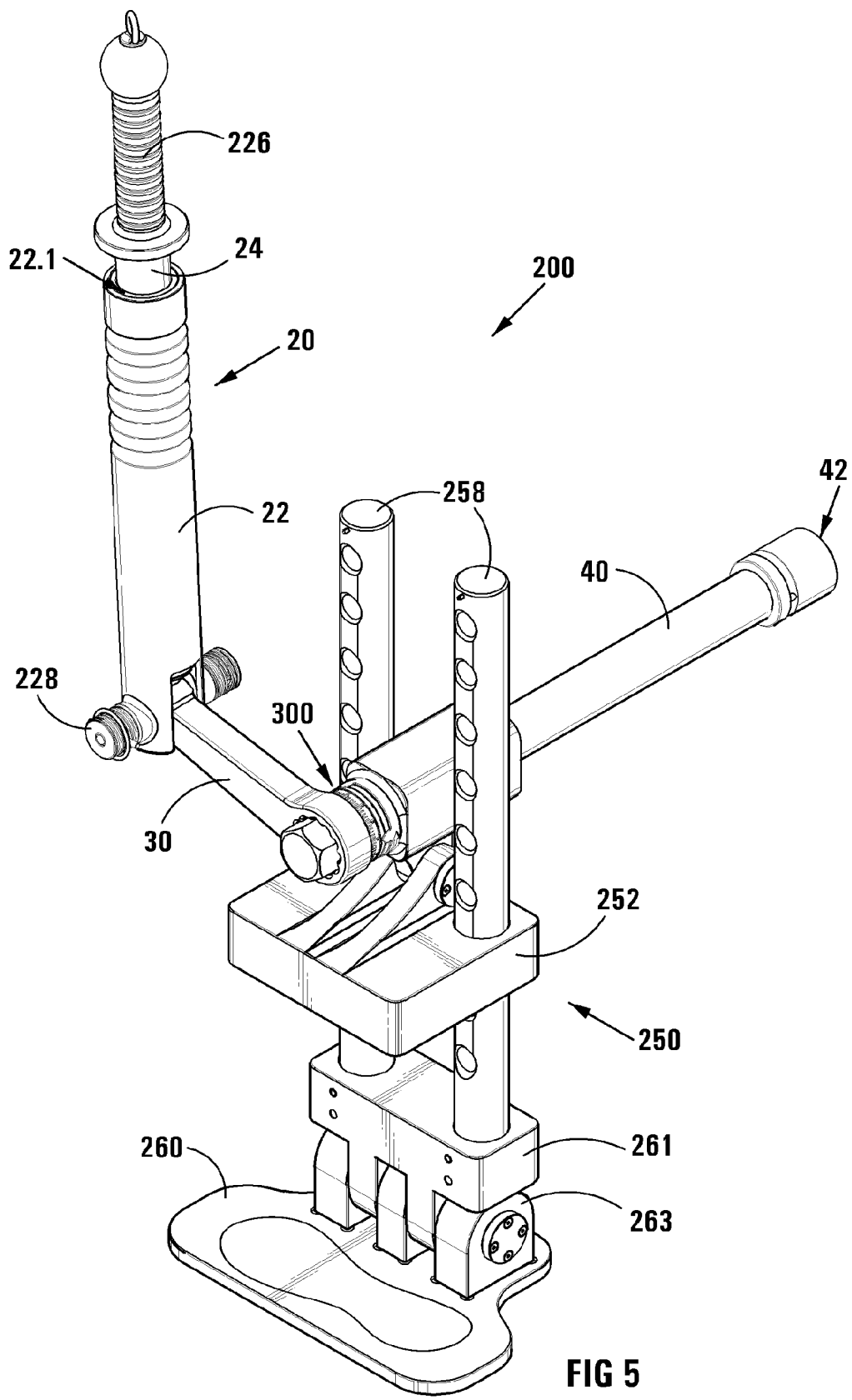
FIG. 5 shows a three-dimensional view of another embodiment of an assembly, in accordance with the invention, for loosening or tightening and torqueing of mechanical nuts.

FIG. 5 shows the assembly 200 which, like the assembly 10, has a sliding hammer 20, a crank 30, a socket arm 40, and a support structure 250.

Figure 6:
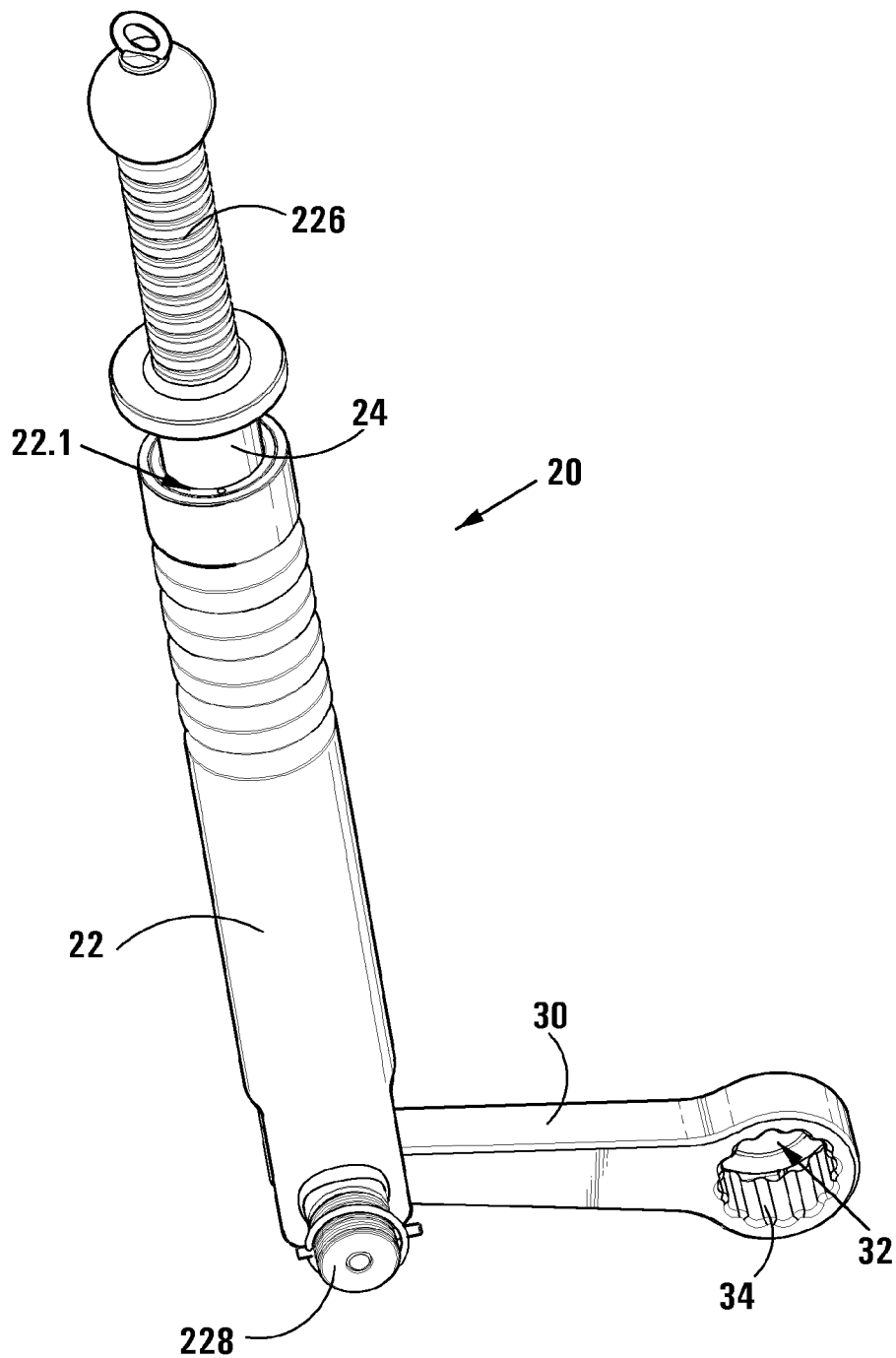
FIG. 6 shows a three-dimensional view of a sliding hammer and crank of the assembly of FIG. 5.

FIG. 6 shows the sliding hammer 20 which includes a slightly different locking pin/axle 228 and grooves/ridges on a handle 226 for extra grip, but otherwise is materially similar to that of the assembly 10.

Figure 7:
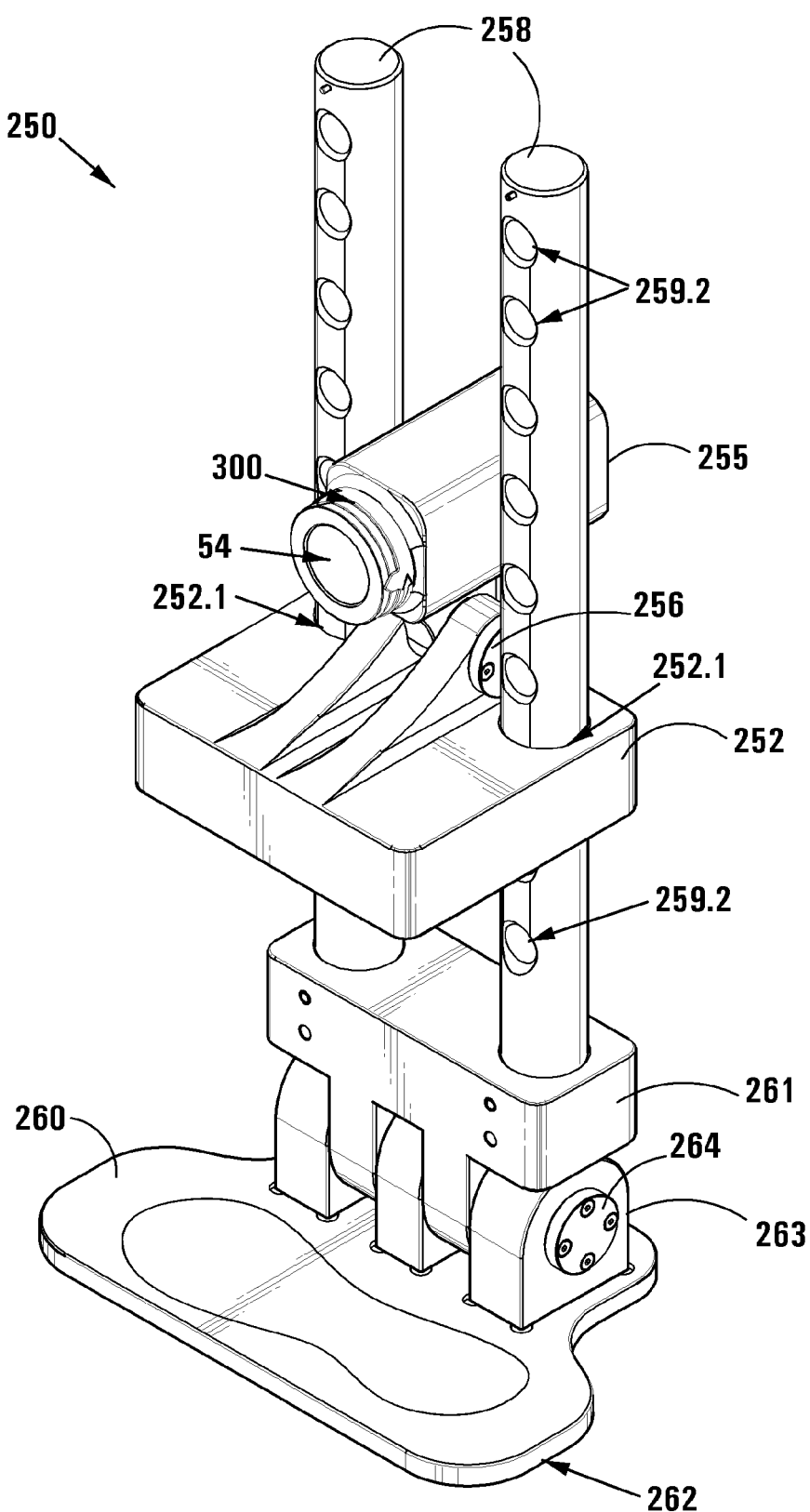
FIG. 7 shows a three-dimensional view of a support structure of the assembly of FIG. 5.

FIG. 7 shows the support structure 250 of the assembly 200. The support structure 250 includes a pair of spaced apart, parallel, upright legs 258. The legs 258 are connected to a foot 260 by means of a pivot joint including a first connector 261 fast with the legs 258, a second connector 263 fast with the foot 260, and an axle 264 about which the connectors 261, 263 can pivot. This permits pivoting of the legs 258 relative to the foot 260. The foot 260 defines on a lower surface thereof a support surface 262 for bearing against the ground 106. The support surface 262 may have a non-slip material, e.g. rubber.

The support structure 250 includes a carrier member 252 which is displaceable up and down the legs 258. To this end, the carrier member 252 defines a pair of spaced apart apertures 252.1 whose spacing is matched to that of the legs 258 so that the carrier member 252 can accommodate the legs 258 in the apertures 252.1 and can travel along the legs 258. The legs 258 each define a series of axially spaced apertures 259.2 for receiving a matched locking bolt to lock the carrier member 252 at a particular elevation relative to the foot 260.

The carrier member 252 carries a tubular body 255 which defines therein the channel 54 to accommodate the socket arm 40. Thus, an elevation of the channel 54 is adjustable by adjusting the position of the carrier 252 along the legs 258. The tubular body 255 is pivotable relative to the carrier member 252 about pivot joint 256.

Figure 8:
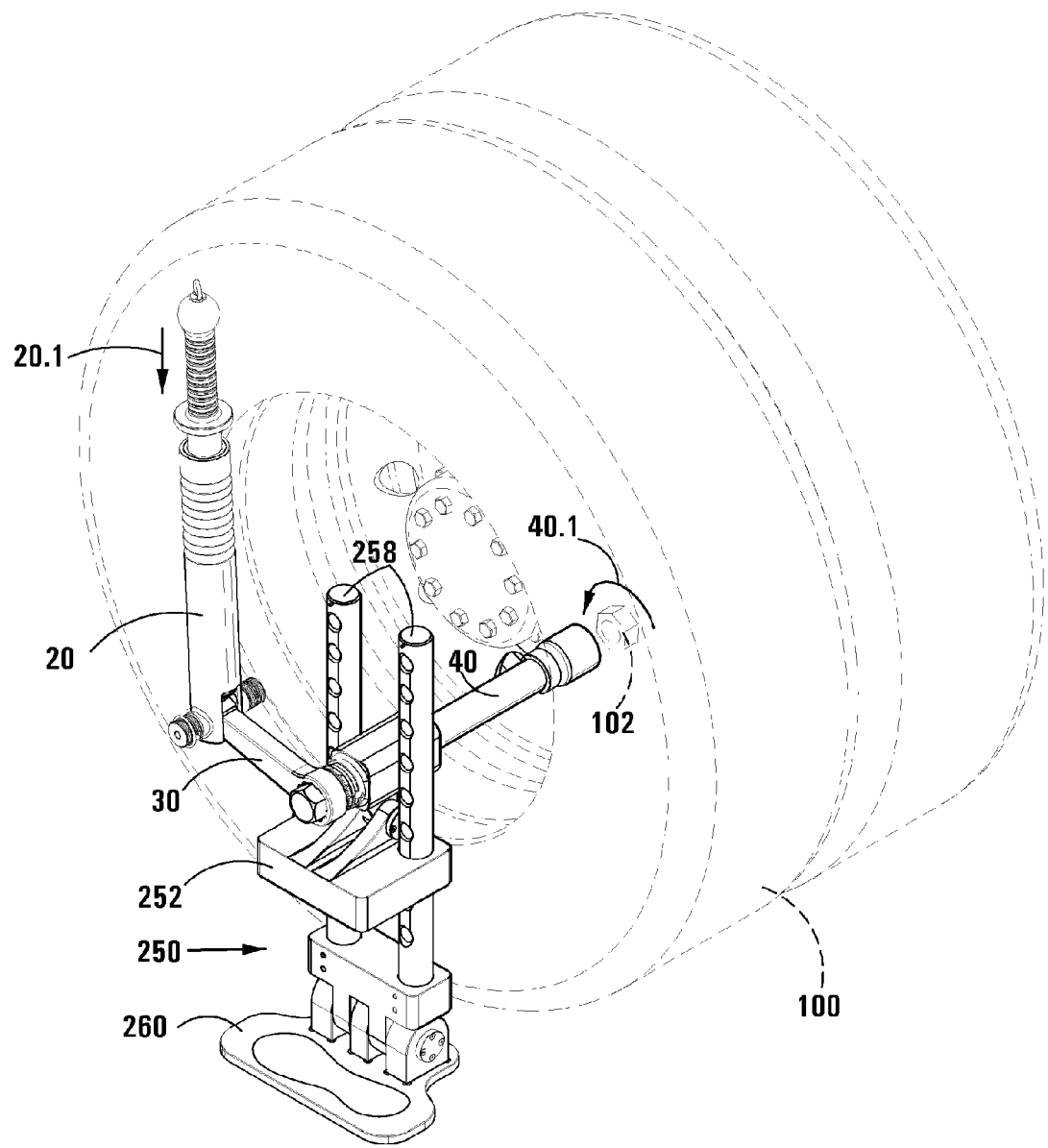
FIG. 8 shows a three-dimensional view of the assembly of FIG. 5 in use.

The assembly 200 is used similarly to the assembly 10 both for tightening and loosening nuts 102 (refer to FIG. 8).

Figure 9:
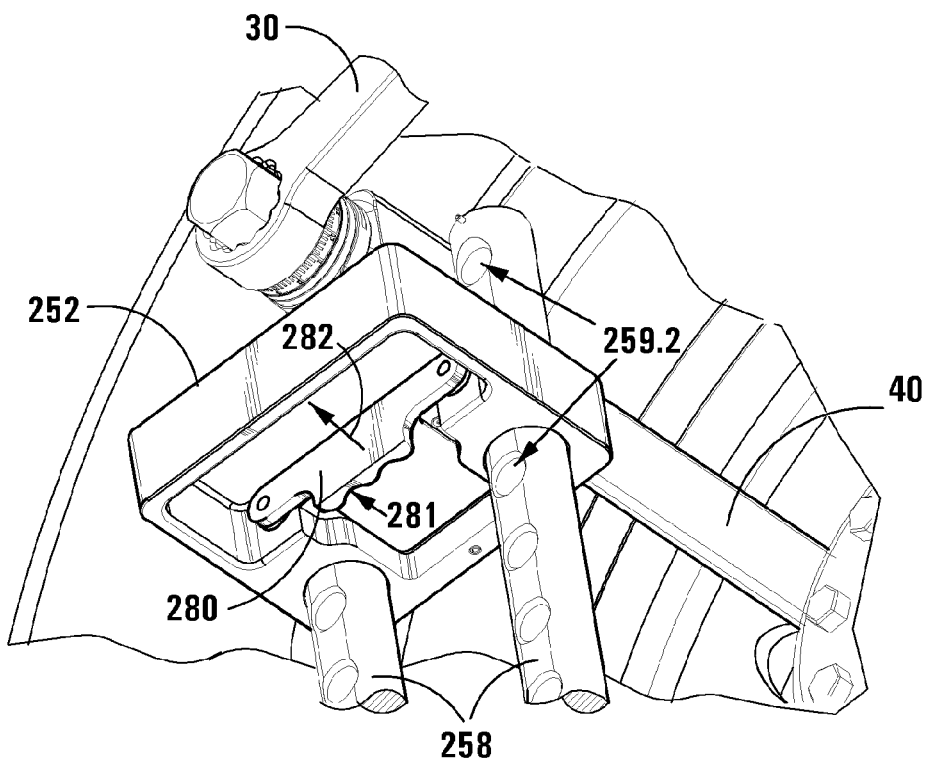
FIG. 9 shows a locking mechanism (locked) of the assembly of FIG. 5.
Figure 10:
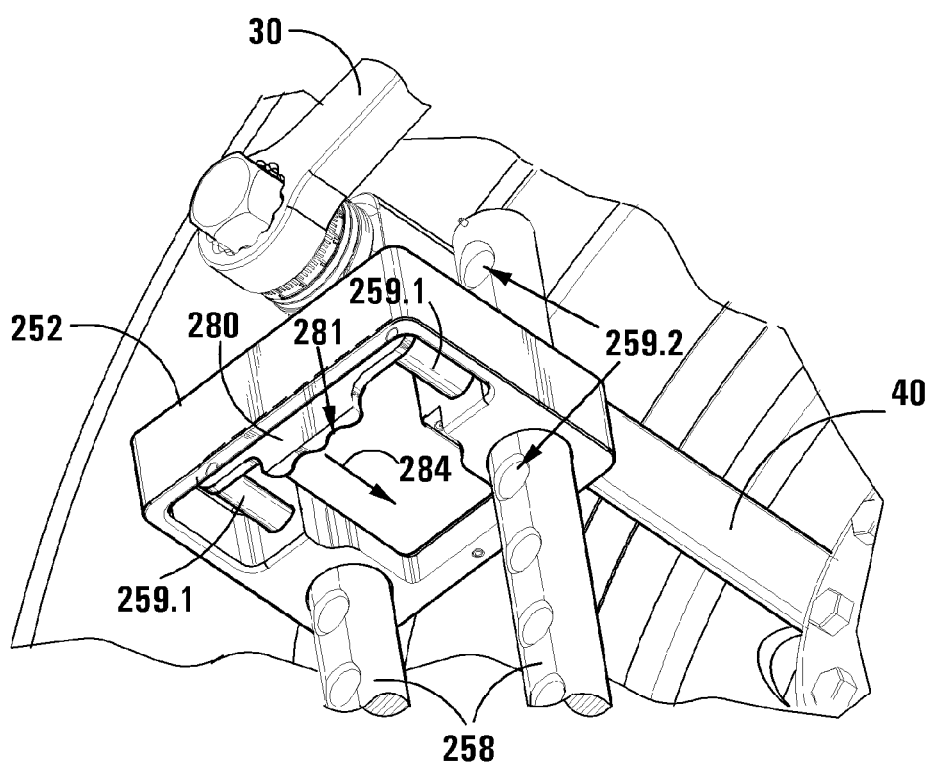
FIG. 10 shows the locking mechanism (unlocked) of FIG. 9.

FIGS. 9-10 show an underside of the carrier member 252 which houses a locking mechanism to lock the carrier member 252 relative to the legs 258. A biased handle 280 is provided in a recess underneath the carrier member 252. The handle 280 is slidable inwardly and outwardly and is biased towards its inward, locked position (FIG. 9).

To adjust a height of the carrier member 252 in use, the user reaches beneath the carrier member 252 with his hand—he does not need to have sight of the handle 280 because convenient gripping formations 281 serve to locate his fingers in place. He then pulls the handle 280 rearwardly/outwardly against the bias in a direction indicated by arrow 282. This withdraws a pair of locking bolts 259.1 which are fast with the handle 280 from the apertures 259.2 and permits the carrier member 252 to slide freely up and down the legs 258.

The user slides the carrier member 252 to a desired height and then releases the handle 280. The bias (e.g. a spring, not illustrated) urges the handle 280 and the locking bolts 259.1 back towards the legs 258 in a direction indicated by arrow 284. Some fine adjustment may be required to align the locking bolts 259.1 with the nearest apertures 259.2. The bias urges the locking bolts 259.1 into the apertures 259.2 and positively locks the carrier member 252 at the selected height.

Figure 11:
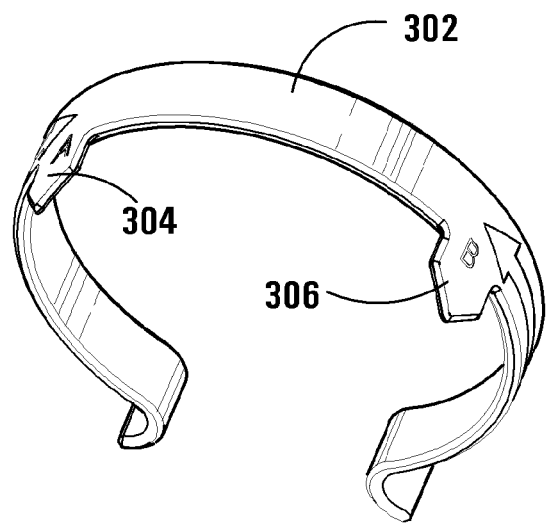
FIG. 11 shows an indicator ring of the assembly of FIG. 5.
Figure 12:
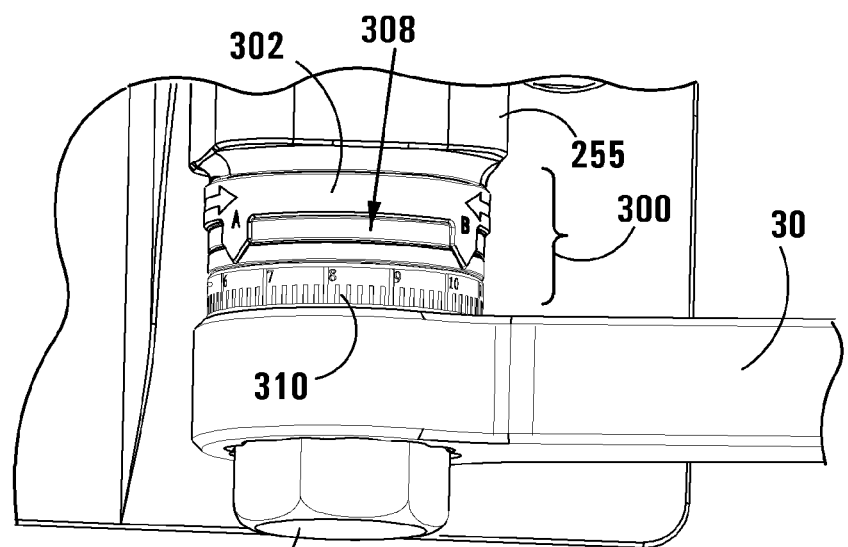
FIG. 12 shows an indicator ring assembly including the indicator ring of FIG. 11.

The assembly 200 also includes an indicator ring assembly 300. FIGS. 11-12 show the indicator ring assembly 300 in detail. The indicator ring assembly 300 includes a resilient ring 302 (FIG. 11). The ring 302 can be seated on a seat 308 defined by the tubular body 255 around the channel 54. The ring 302 is firmly seated and forms a frictional engagement with the seat 308 but can be displaced by hand to adjust its circumferential position. The ring 302 has two teeth 304, 306 to function as position markers: marker A 304 and marker B 306. Different sizes of rings 302 may be provided, e.g. 30 mm, 32 mm, 33 mm, etc.

A matched gauge or scale 310 is provided on the socket arm 40. The gauge 310 is in the form of a circular ruler fast with or fastenable to the socket arm 40. The gauge 310 has metric units (e.g. centimetres) in the example but could have imperial or other units. Because the ring 302 is fast with the tubular body 255 and the gauge is fast with the socket arm 40, and because the socket arm 40 is rotationally displaceable within the channel 54 relative to the tubular body 255, the ring 302 is thus rotationally displaceable relative to the gauge 310. Thus, when the socket arm 40 rotates within the channel 54, the indicator ring assembly 300 provides a visual and quantitative indication of the displacement.

The angular displacement of the socket arm 40 may be representative of torque applied by the socket arm 40. Thus, proper calibration of the indicator ring assembly 300 renders it a torque indicator and it can be used for torqueing the nut 102 when tightening it. The spacing between the position markers 304, 306 is calculated to represent a specified torqueing distance corresponding to a torque specification provided by a manufacturer of the wheel 100.

In use, the nut 102 is tightened by hand until it can be tightened no further. Then, the crank 30 is orientated horizontally and the sliding hammer 20 upwardly. The handle 226 is withdrawn fully and dropped so that it falls under gravity only. This is done four times in total. As the weight of the sliding hammer 20 and length of the crank 30 are known, the impact can be precisely calculated. This process provides a definable and repeatable reference or datum point for torqueing.

Once the reference point has been set, the ring 302 is rotated by hand so that marker A 304 is in view and aligned with one of the readings (e.g. the no. 7) on the gauge 310. The sliding hammer 20 is then repeatedly actuated forcefully by hand causing the socket arm 30 to tighten the nut 102 further, rotating incrementally with each strike. When the socket arm 30 has moved sufficiently for the marker B 304 to align with the reading (e.g. the no. 7) on the gauge 310, the nut 102 should then be sufficiently torqued to specification.

The Inventors believe that the invention as exemplified provides a convenient, effective and safer assembly 10, 200 for dislodging stubborn or stuck nuts 102. The various parts are interchangeable for nuts 102 and wheel assemblies 100 of differing configurations, and for servicing and replacement.

In addition, the assembly 10, 200 can also tighten nuts 102 and the assembly 200 can even torque nuts 102, which the Inventors believe is unusual for an assembly this compact.

The invention claimed is:

1. An assembly for loosening or tightening mechanical nuts, the assembly comprising:

a socket arm defining a cavity at its distal end configured for engaging a mechanical nut;

a crank configured to connect at its first end transversely to a proximate end of the socket arm, such that the crank is rotatable about an axis of the socket arm;

a sliding hammer configured to connect to a second end of the crank, thereby being operable to impart a rotational impact on the socket arm via the crank, wherein the sliding hammer includes a cylinder defining therein a guide path which accommodates a piston, wherein the piston has a handle at a free and an impact head at an inner end;

a support structure configured to connect at its proximate end to at least one of the socket arm, crank, or sliding hammer and defining at its remote end a support surface operable to bear against an external structure thereby to support the assembly in use; and a torque indicator in the form of an indicator ring assembly arranged between the support structure and the socket arm thereby to indicate the relative rotational displacement of the socket arm relative to the support structure, the rotational displacement being indicative of torque, wherein the indicator ring comprises two position markers, and wherein a spacing between the position markers is calculated to represent a specified torqueing distance based on an impact of the sliding hammer.

2. The assembly of claim 1, wherein the socket arm defines splines at its proximate end and the crank defines mating splines at its first end configured to mate with the socket arm splines and to maintain an angular correspondence therebetween.

3. The assembly of claim 1, wherein the crank is pivotally connected at its second end to a proximate end of the sliding hammer.

4. The assembly of claim 1, wherein the support structure is configured to connect to the socket arm.

5. The assembly of claim 4, wherein the support structure defines a channel configured to accommodate a portion of the socket arm.

6. The assembly of claim 5, wherein the support structure includes a carrier member defining the channel.

7. The assembly of claim 6, wherein the channel is operable to permit rotation of the socket arm and to prevent radial displacement of the socket arm.

8. The assembly of claim 7, wherein the support surface is configured to bear against ground.

9. The assembly of claim 8, wherein the support surface is in a form of a foot and the support structure further comprises a support leg extending upwardly from the foot.

10. The assembly of claim 9, wherein the foot is pivotable relative to the support leg.

11. The assembly of claim 9, wherein the support structure includes a locking mechanism operable to lock the carrier member to the support leg at a desired height, thereby to align the socket arm with the nut.

12. A method of loosening a mechanical nut using the assembly of claim 1, the method comprising:

adjusting the support structure so that the socket arm is aligned with the nut;

engaging the distal end of the socket arm with the nut; and actuating the sliding hammer to impart an impact via the crank and socket arm to the nut.

13. The method of claim 12, further comprising orientating the sliding hammer and crank transversely before actuating the sliding hammer, thereby to transmit maximum impact to the nut.

14. The method of claim 12, wherein the assembly further comprises a torque indicator and the method further comprises:

tightening the nut to a definable reference point using the sliding hammer by dropping the handle of the sliding hammer under gravity only; and further tightening the nut by a pre-defined angular distance as indicated by the torque indicator by forcefully actuating the sliding hammer by hand.

15. The assembly of claim 1, wherein the position markers of the indicator ring assembly respectively represent a reference position marker set which is set by dropping the handle of the sliding hammer under gravity only and a torqued position marker which is set by forcefully actuating the sliding hammer by hand.

* * * * *